(12) United States Patent
Wobben

(10) Patent No.: US 7,249,486 B2
(45) Date of Patent: Jul. 31, 2007

(54) METHOD FOR MONITORING A SENSOR

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/496,335

(22) PCT Filed: Nov. 15, 2002

(86) PCT No.: PCT/EP02/12721

§ 371 (c)(1),
(2), (4) Date: Nov. 1, 2004

(87) PCT Pub. No.: WO03/046378

PCT Pub. Date: Jun. 5, 2003

(65) Prior Publication Data

US 2005/0044949 A1    Mar. 3, 2005

(30) Foreign Application Priority Data

Nov. 27, 2001    (DE) .............................. 101 57 759

(51) Int. Cl.
*G01F 25/00* (2006.01)
*G01P 21/00* (2006.01)

(52) U.S. Cl. ............... 73/1.29; 73/1.16; 73/1.25; 73/1.26; 73/1.27; 73/1.28; 73/1.34; 73/1.35; 73/196

(58) Field of Classification Search ........... 73/1.16, 73/1.25, 1.26, 1.27, 1.28, 1.29, 1.34, 1.35, 73/196
See application file for complete search history.

(56) References Cited

U.S. PATENT DOCUMENTS

| 2,265,787 | A | * | 12/1941 | White | 73/112 |
| 2,844,960 | A | * | 7/1958 | Staros | 73/181 |
| 4,112,311 | A | * | 9/1978 | Theyse | 290/44 |
| 4,331,881 | A | * | 5/1982 | Soderholm et al. | 290/44 |
| 4,829,441 | A | * | 5/1989 | Mandle et al. | 702/96 |
| 5,237,975 | A | * | 8/1993 | Betki et al. | 123/497 |
| 6,205,376 | B1 | * | 3/2001 | Gordon | 701/4 |

FOREIGN PATENT DOCUMENTS

| EP | 0 522 832 A1 | 1/1993 |
| EP | 1 361 445 | 11/2003 |
| WO | WO 01/35109 A1 | 5/2001 |

* cited by examiner

*Primary Examiner*—Hezron Williams
*Assistant Examiner*—Samir M. Shah
(74) *Attorney, Agent, or Firm*—Seed IP Law Group PLLC

(57) ABSTRACT

The present invention concerns a method of monitoring a sensor for sensing the flow speed of a medium. The invention further concerns an apparatus for carrying out that method. In order to be able to monitor the sensor, without providing redundant sensors, the flow speed of the medium, which is specified by the sensor, is correlated with at least one operating parameter of an installation operated with the medium. For that purpose the apparatus according to the invention includes a sensor for detecting the flow speed of a medium, an installation operated with the medium and a correlation device for correlating the flow speed of the medium, which is specified by the sensor, with at least one operating parameter of the installation.

4 Claims, 4 Drawing Sheets

METHOD FOR MONITORING A SENSOR

BACKGROUND OF THE INVENTION

1. Field of the Invention

The present invention concerns a method of monitoring a sensor for sensing the flow speed of a medium. The invention further concerns an apparatus for carrying out that method.

2. Description of the Related Art

It is already known from JP 11072502 to test the anemometer which is operating defectively in a process or to establish defective operation thereof. In that situation, the signal of the anemometer is evaluated by means of a computer and, with varying wind conditions, the evaluated data are compared and an error signal can be deduced therefrom.

JP 57-198870 discloses a test device for anemometers, in which anemometers are tested under working conditions. U.S. Pat. No. 4,331,881 discloses how an anemometer can be used in a wind power installation, the signal from the anemometer being used to control the wind power installation.

Sensors for monitoring flow speeds of media which are capable of flow have long been known. Quantitative flow speed meters are used in many variations, in dealing with liquids. Anemometers for example are used in the most widely varying structural configurations in relation to gaseous media which also include air.

Those sensors are frequently exposed in situ to environmental conditions which can adversely effect reliable operability thereof. For example, anemometers arranged on wind power installations, depending on the weather, can certainly be subjected to icing. It will be easily appreciated that such an iced-up anemometer can scarcely still ascertain and deliver a correct value for the flow speed of the air. Redundancy does not afford a satisfactory solution here, as the redundantly provided anemometer is naturally also subjected to the icing effect.

BRIEF SUMMARY OF THE INVENTION

Therefore the object of the present invention is to develop a method and an apparatus for monitoring a sensor such that monitoring of a sensor is possible without the provision of redundant sensors.

That is embodied in the method by the correlation of the flow speed of the medium, which is given by the sensor, with at least one operating parameter of an installation operated with the medium. In that respect the invention is based on the realization that such an installation is operated not only on the basis of the data from that one sensor, but frequently operation is dependent on a plurality of parameters. In that manner, a given operating state occurs, independently of the sensor to be monitored but in dependence on the respective flow conditions. If now a characteristic operating parameter is correlated with the flow speed specified by the sensor, it is possible to deduce from that correlation an indication as to whether those values are in a plausible relationship with each other, that is to say whether the sensor is operating faultlessly.

The object of the invention is further attained by an apparatus having a sensor for detecting the flow speed of a medium, an installation operated with the medium and a correlation device for correlating the flow speed of the medium, which is specified by the sensor, with at least one operating parameter of the installation.

In a preferred development of the method the data from the sensor are correlated with a plurality of operating parameters in parallel or successive relationship. Parallel correlation of the data increases the reliability of the information provided about the sensor function. On the other hand however, depending on the operating state of the installation, it may be appropriate, according to the respective operating conditions involved, firstly to use a first operating parameter for the correlation procedure, but, with changing operating conditions, to make use of a second or further operating parameters for the correlation procedure in order to arrive at an assessment which is as reliable as possible.

In a particularly preferred embodiment of the invention the correlation device is already integrated into the installation and thus can easily detect the operating parameters required for the correlation procedure and implement a suitable comparison.

BRIEF DESCRIPTION OF THE SEVERAL VIEWS OF THE DRAWINGS

Advantageous developments of the invention are set forth in the appendant claims.

An embodiment of the invention is described in greater detail hereinafter with reference to the drawings in which.

DETAILED DESCRIPTION OF THE INVENTION

Figure 1:
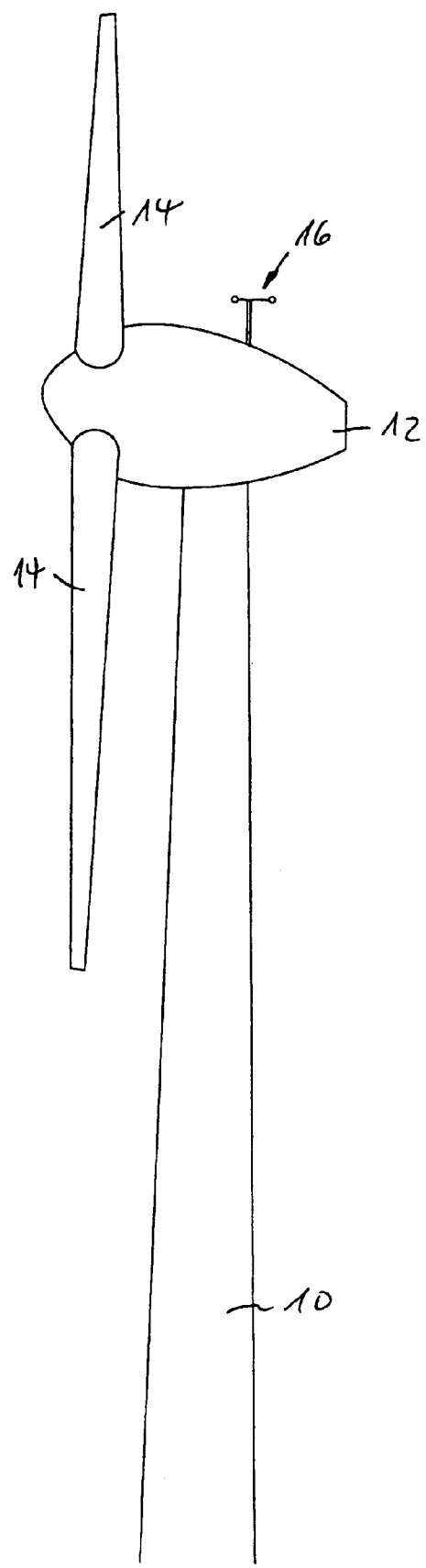
FIG. 1 shows a wind power installation.

FIG. 1 shows a wind power installation comprising a pylon 10, a pod 12 arranged on the pylon 10, with a rotor having rotor blades 14 for driving a generator arranged in the pod, the generator producing electrical power in dependence on the wind speed. Also provided on the pod 12 is an anemometer 16 for detecting the wind speed.

As, in particular in winter, in cold weather conditions, the anemometer 16 can certainly suffer from icing and thus the wind speed can be incorrectly indicated, the anemometer 16 is monitored by the power produced by the wind power installation, which is dependent on the wind speed, being correlated with the reading from the anemometer 16. If the generated power of the wind power installation is higher than would be expected according to the wind speed ascertained by the anemometer 16, it is possible to deduce therefrom that the anemometer is not functioning faultlessly as the generated power could finally not be produced if the wind speed were not sufficient for that to happen.

Figure 2:
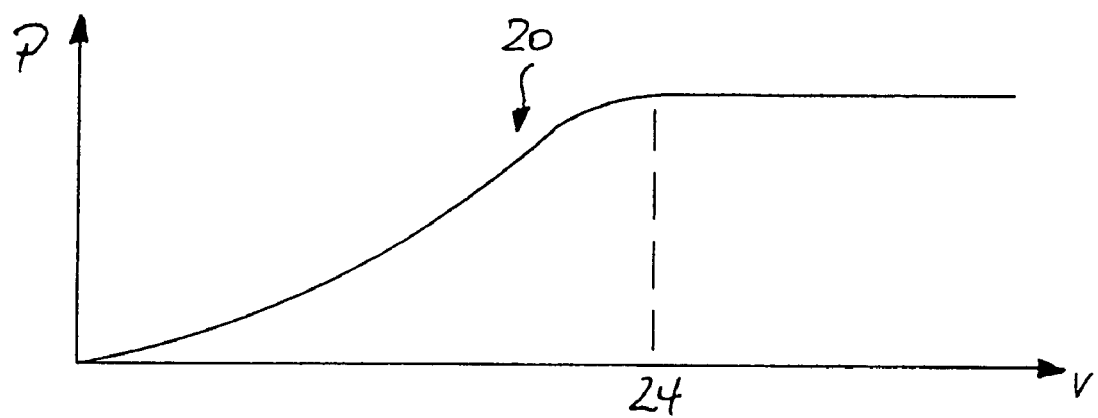
FIG. 2 shows characteristic curves of operating parameters of the wind power installation.
Figure 2:
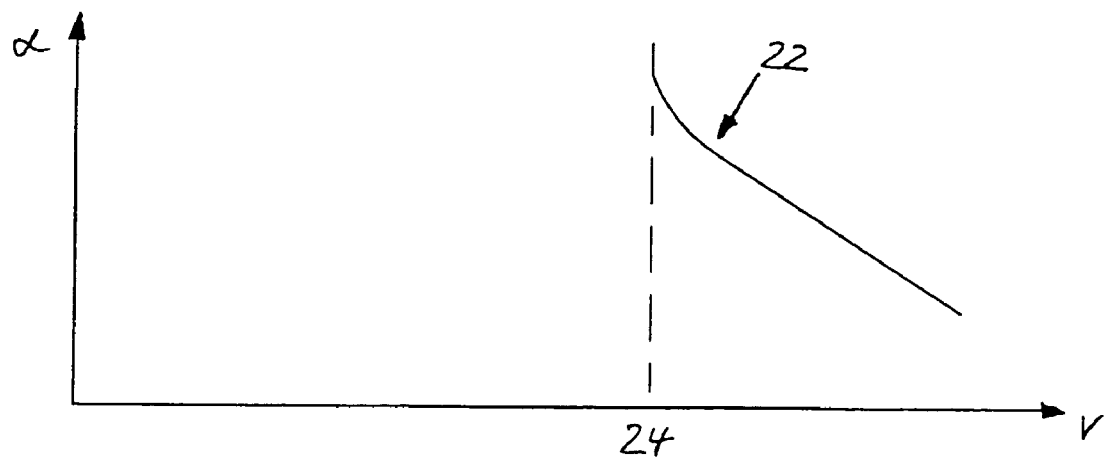

That relationship is shown once again in FIG. 2 by means of characteristic curves. The characteristic curve 20 represents the variation in the power produced by the wind power installation in dependence on the wind speed. The abscissa is therefore identified by 'V' for the wind speed and the ordinate by 'P' for power. As can be seen from the characteristic curve, the power rises with increasing wind speed until the nominal wind speed is reached at a point marked by 24 on the abscissa. From here on the wind power installation produces the nominal power. Thus, at least for the range from the origin of the curve to that switch-over point 24, the wind speed can be correlated with the power produced, in order to deduce from that correlation whether the anemometer 16 is functioning properly.

After the nominal wind speed is reached however the curve 20 no longer provides any usable indication in regard to the correlation with the wind speed specified by the anemometer. Instead of the power characteristic curve however it is now possible to use the blade angle characteristic curve 22. From the moment of reaching the nominal wind speed and with a wind speed which further increases, more specifically the pitch angle of the rotor blades is altered. That is illustrated in the lower characteristic curve: here the abscissa is once again marked by 'V' for the wind speed and the ordinate by 'a' for the pitch angle of the rotor blades. It can be seen from the curve that the pitch angle decreases with increasing wind speed. Thus, after the curve goes beyond the switch-over point 24, it is possible, on the basis of the pitch angle 'a' of the rotor blades, to determine whether the anemometer 16 is still specifying the correct wind speed.

It will be appreciated that, instead of that successive use of a plurality of operating parameters, such use being dependent on the range of operation of the wind power installation, it is also possible for those parameters to be taken into consideration simultaneously. Therefore, as long as the wind speed is below the nominal wind speed, the electric power generated by the installation is used as the operating parameter and at the same time the pitch angle of the rotor blades 14 is investigated. After the curve has gone beyond the switch-over point 24 and thus the nominal wind speed has been exceeded, the pitch angle of the rotor blades 14 is now used and at the same time the power generated by the installation is taken into consideration.

Figure 3:
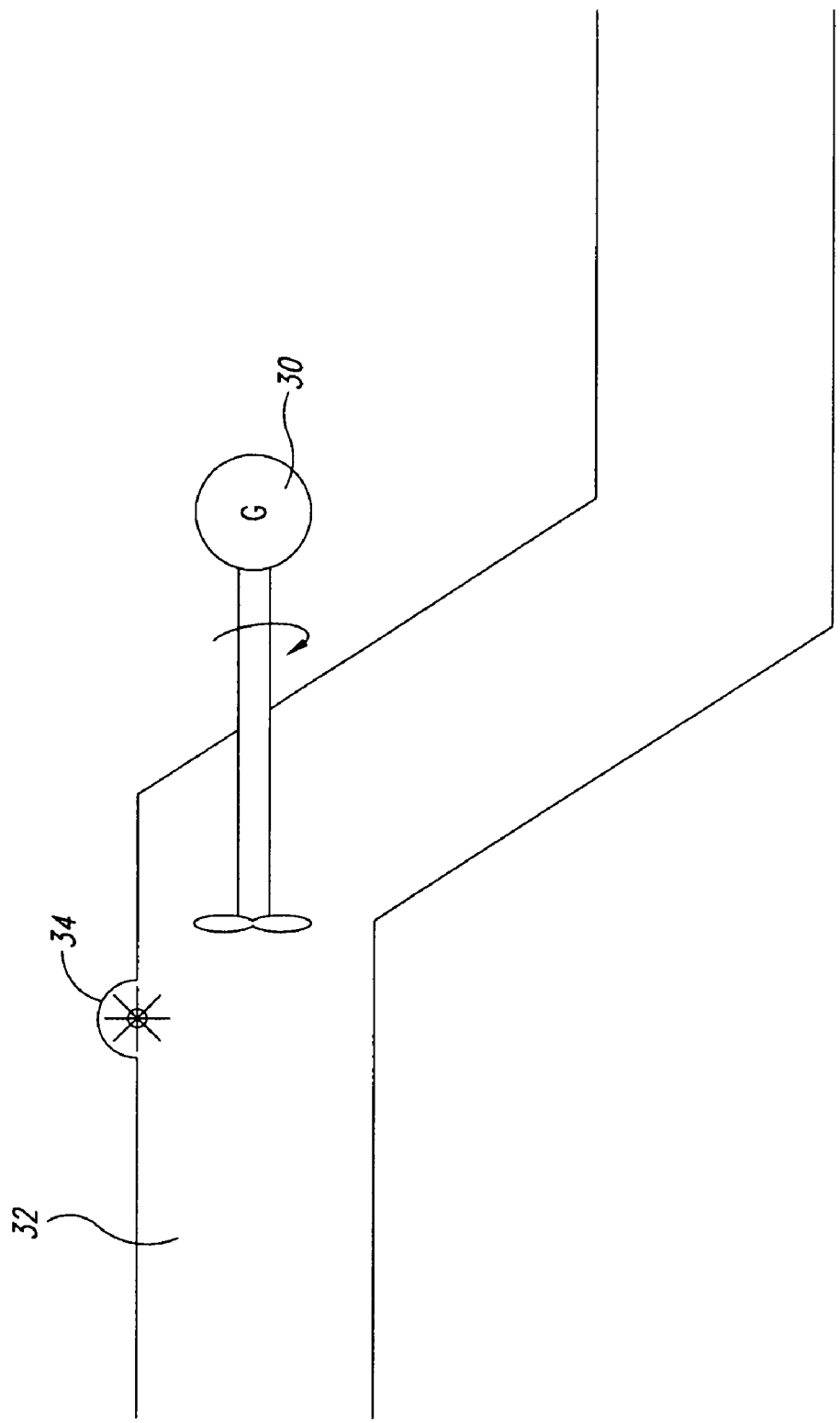
FIG. 3 is a simplified schematic of a hydroelectric plant making use of the invention.

As shown in FIG. 3, it will be appreciated that this method according to the invention and the apparatus can be applied not only in relation to wind power installations. In hydroelectric power stations 30, the amount of water 32 flowing therethrough can be measured by sensor 34 and correlated with the electrical power generated.

Figure 4:
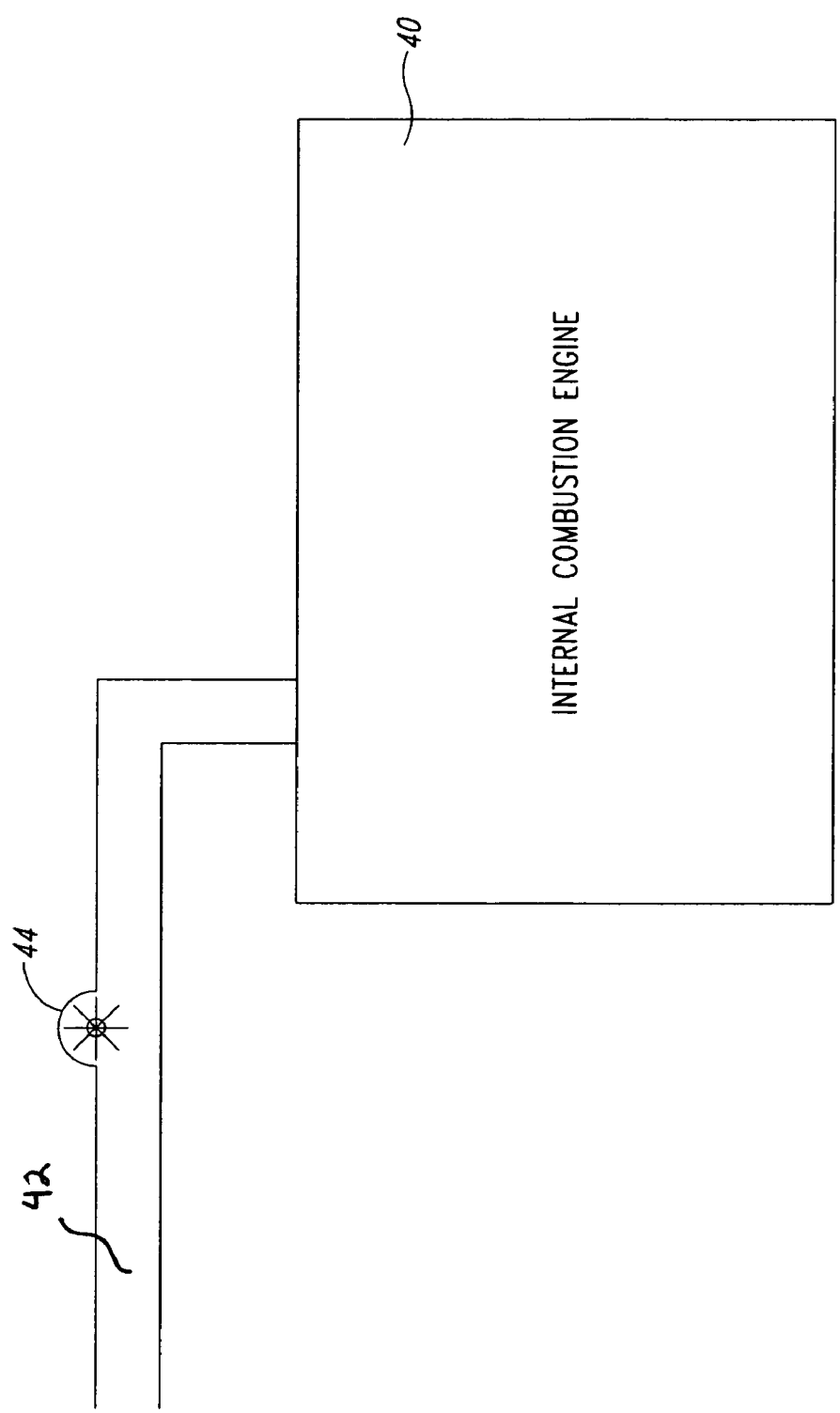
FIG. 4 is a simplified schematic of an internal combustion engine making use of the invention.

As shown in FIG. 4, these methods and this apparatus can also be used even in internal combustion engines 40, in order for example to monitor the feed of fuel 42 by sensor 44. Here the quantitative through-flow rate of the fuel 42 can be correlated with the mechanical power produced.

The power output of the wind power installation and the pitch angle are combined and used to obtain an estimated wind speed. This estimate is thus obtained from the operating parameter of the wind power installation. These are then compared to the data collected by the sensor, in one example a wind speed as sensed by the anemometer. The accuracy of the data output by the sensor can therefore be checked. This may permit recalibration of the sensor, fixing the sensor, or in some cases, substituting the data from the wind installation as the valid data in place of the data collected by the sensor.

The invention claimed is:

1. A method for monitoring a sensor for detecting a flow speed of fluid adjacent to a power installation comprising:
outputting a measure of the flow speed from the sensor;
calculating a flow speed using data from an operating parameter of the power installation; and
comparing the flow speed output from the sensor with the flow speed calculated by the power installation to determine the accuracy of the flow speed sensor.

2. The method according to claim 1 wherein the power installation is a wind power installation and the flow sensor is an anemometer.

3. The method according to claim 1 characterized by the simultaneous or successive use of a plurality of operating parameters for comparison with the flow speed output from the sensor.

4. A method of monitoring an anemometer used for detecting the flow speed of a medium comprising:
using the anemometer to obtain a first measurement of the flow speed of the medium;
using an operating parameter that is driven by the medium, the operating parameter being of a wind power installation, to obtain a second measurement of the flow speed of the medium;
comparing said measurements in order to monitor the operational state of said anemometer.

* * * * *

UNITED STATES PATENT AND TRADEMARK OFFICE
CERTIFICATE OF CORRECTION

PATENT NO.        : 7,249,486 B2                                     Page 1 of 1
APPLICATION NO.   : 10/496335
DATED             : July 31, 2007
INVENTOR(S)       : Aloys Wobben It is certified that error appears in the above-identified patent and that said Letters Patent is hereby corrected as shown below:

Title Page, Item (22), PCT Filing Date, "Nov. 15, 2002" should read as -- Nov. 14, 2002 --

Signed and Sealed this

Thirteenth Day of May, 2008

JON W. DUDAS
*Director of the United States Patent and Trademark Office*